US008217945B1

(12) United States Patent
Moscovici

(10) Patent No.: US 8,217,945 B1
(45) Date of Patent: Jul. 10, 2012

(54) SOCIAL ANNOTATION OF A SINGLE EVOLVING VISUAL REPRESENTATION OF A CHANGING DATASET

(75) Inventor: Marius Andy Moscovici, San Francisco, CA (US)

(73) Assignee: Metric Insights, Inc., San Francisco, CA (US)

( * ) Notice: Subject to any disclaimer, the term of this patent is extended or adjusted under 35 U.S.C. 154(b) by 0 days.

(21) Appl. No.: 13/224,349

(22) Filed: Sep. 2, 2011

(51) Int. Cl.
*G06T 11/20* (2006.01)
(52) U.S. Cl. ........................................ 345/440
(58) Field of Classification Search .................. 345/440
See application file for complete search history.

(56) References Cited

U.S. PATENT DOCUMENTS

| | | | | |
|---|---|---|---|---|
| 5,487,172 | A | * | 1/1996 | Hyatt ............................... 712/32 |
| 5,793,895 | A | * | 8/1998 | Chang et al. .................. 382/236 |
| 5,940,078 | A | * | 8/1999 | Nagarajayya et al. ........ 715/859 |
| 5,991,741 | A | * | 11/1999 | Speakman et al. .............. 705/30 |
| 6,141,018 | A | * | 10/2000 | Beri et al. ...................... 345/473 |
| 6,496,832 | B2 | | 12/2002 | Chi et al. |
| 7,006,568 | B1 | * | 2/2006 | Gu et al. .................. 375/240.11 |
| 7,103,843 | B2 | | 9/2006 | Hand et al. |
| 7,130,807 | B1 | | 10/2006 | Mikurak |
| 7,152,786 | B2 | * | 12/2006 | Brundage et al. .............. 235/380 |
| 7,165,041 | B1 | | 1/2007 | Guheen et al. |
| 7,242,371 | B2 | * | 7/2007 | Havey et al. ....................... 345/8 |
| 7,248,263 | B2 | | 7/2007 | Freeman et al. |
| 7,430,670 | B1 | | 9/2008 | Horning et al. |
| 7,477,285 | B1 | * | 1/2009 | Johnson ........................ 348/143 |
| 7,610,553 | B1 | | 10/2009 | Jacklin et al. |
| 7,716,227 | B1 | | 5/2010 | Hao et al. |
| 7,890,489 | B2 | | 2/2011 | Stewart et al. |
| 7,895,167 | B2 | | 2/2011 | Berg et al. |
| 7,941,386 | B2 | | 5/2011 | Bousquet et al. |
| 7,953,265 | B2 | | 5/2011 | Sirohey et al. |
| 7,966,246 | B2 | | 6/2011 | Ingargiola et al. |
| 7,984,142 | B2 | | 7/2011 | Childress et al. |

(Continued)

FOREIGN PATENT DOCUMENTS

EP    1455516 A2    9/2004

(Continued)

OTHER PUBLICATIONS

Database Issues for Data Visualization: Supporting Interactive Database Explorartion , Daniel A. Keim, John Peter Lee, Bhavani M. Thuraisingham, Craig M. Wittenbrink, Oct. 1995 Proceedings of the IEEE Visualization '95 Workshop on Database Issues for Data Visualization.*

(Continued)

*Primary Examiner* — Javid A Amini
(74) *Attorney, Agent, or Firm* — Raj Abhyanker, P.C.

(57) ABSTRACT

Systems and methods of social annotation of a single evolving visual representation of a changing dataset are disclosed. In one or more embodiments, the method includes generating a visual representation of a dataset at an initial time and automatically updating the visual representation of the dataset to reflect the dataset at a changed time through an algorithm that applies changed values between the dataset at the initial time and the dataset at the changed time while maintaining a previous calculation of an unchanged portion of the dataset at the initial time. The method further includes generating an alert when the change status indicates that the underlying data has changed beyond the threshold tolerance range. The method further includes placing a note associated with a first user on the visual representation.

5 Claims, 12 Drawing Sheets

U.S. PATENT DOCUMENTS

| | | | |
|---|---|---|---|
| 7,996,786 | B2 | 8/2011 | MacLaurin et al. |
| 8,000,928 | B2 | 8/2011 | Scott et al. |
| 2002/0078338 | A1* | 6/2002 | Lay et al. ............... 713/2 |
| 2002/0138492 | A1 | 9/2002 | Kil |
| 2003/0079160 | A1 | 4/2003 | McGee et al. |
| 2003/0110007 | A1 | 6/2003 | McGee et al. |
| 2003/0114891 | A1 | 6/2003 | Hiebert et al. |
| 2003/0160862 | A1* | 8/2003 | Charlier et al. ........ 348/14.08 |
| 2004/0054296 | A1 | 3/2004 | Ramseth |
| 2004/0088406 | A1 | 5/2004 | Corley et al. |
| 2004/0090950 | A1* | 5/2004 | Lauber et al. ............ 370/352 |
| 2005/0060302 | A1 | 3/2005 | Sauermann et al. |
| 2005/0119801 | A1* | 6/2005 | Florentin et al. ............ 701/2 |
| 2005/0138020 | A1 | 6/2005 | Lokken |
| 2005/0197792 | A1 | 9/2005 | Haeuptle |
| 2006/0036931 | A1* | 2/2006 | Shan et al. ............ 714/796 |
| 2006/0206512 | A1 | 9/2006 | Hanrahan et al. |
| 2006/0241949 | A1* | 10/2006 | Tobias et al. ............ 705/1 |
| 2006/0274031 | A1* | 12/2006 | Yuen et al. ............ 345/156 |
| 2006/0288031 | A1* | 12/2006 | Lee ........................ 707/101 |
| 2006/0291558 | A1* | 12/2006 | Schreier et al. ........ 375/240.13 |
| 2006/0294095 | A1 | 12/2006 | Berk et al. |
| 2007/0011188 | A1 | 1/2007 | Chitgupakar et al. |
| 2007/0033129 | A1 | 2/2007 | Coates |
| 2007/0067210 | A1 | 3/2007 | Rishell et al. |
| 2007/0086347 | A1* | 4/2007 | Reynolds ............ 370/237 |
| 2007/0100967 | A1* | 5/2007 | Smith et al. ............ 709/219 |
| 2007/0263009 | A1 | 11/2007 | Li et al. |
| 2007/0288605 | A1* | 12/2007 | Doraiswamy et al. ........ 709/220 |
| 2008/0033776 | A1 | 2/2008 | Marchese |
| 2008/0046484 | A1 | 2/2008 | Ellis et al. |
| 2008/0172629 | A1* | 7/2008 | Tien et al. ............ 715/771 |
| 2008/0177994 | A1* | 7/2008 | Mayer ............... 713/2 |
| 2008/0178111 | A1 | 7/2008 | Childress et al. |
| 2008/0219154 | A1* | 9/2008 | Durrey et al. ............ 370/225 |
| 2008/0270363 | A1 | 10/2008 | Hunt et al. |
| 2008/0288889 | A1 | 11/2008 | Hunt et al. |
| 2008/0294996 | A1 | 11/2008 | Hunt et al. |
| 2008/0297513 | A1* | 12/2008 | Greenhill et al. ............ 345/440 |
| 2008/0319829 | A1* | 12/2008 | Hunt et al. ............ 705/10 |
| 2009/0006156 | A1 | 1/2009 | Hunt et al. |
| 2009/0006283 | A1 | 1/2009 | Labrie et al. |
| 2009/0018996 | A1 | 1/2009 | Hunt et al. |
| 2009/0033664 | A1 | 2/2009 | Hao et al. |
| 2009/0192740 | A1 | 7/2009 | Rule et al. |
| 2009/0195538 | A1* | 8/2009 | Ryu et al. ............ 345/419 |
| 2009/0282361 | A1 | 11/2009 | Cortright |
| 2010/0005518 | A1 | 1/2010 | Tirpak et al. |
| 2010/0057618 | A1* | 3/2010 | Spicer et al. ............ 705/64 |
| 2010/0060640 | A1* | 3/2010 | Melikian et al. ............ 345/427 |
| 2010/0070448 | A1* | 3/2010 | Omoigui ............ 706/47 |
| 2010/0079576 | A1* | 4/2010 | Yuen et al. ............ 348/14.16 |
| 2010/0082695 | A1 | 4/2010 | Hardt |
| 2010/0122309 | A1 | 5/2010 | Kawakami et al. |
| 2010/0138388 | A1 | 6/2010 | Wakeling |
| 2010/0235285 | A1 | 9/2010 | Hoffberg |
| 2010/0250497 | A1 | 9/2010 | Redlich et al. |
| 2010/0257113 | A1 | 10/2010 | Dorrell |
| 2010/0265324 | A1 | 10/2010 | Spalding |
| 2010/0299175 | A1 | 11/2010 | Marchildon et al. |
| 2010/0312747 | A1* | 12/2010 | Stolte et al. ............ 707/602 |
| 2011/0025717 | A1 | 2/2011 | Gilmore et al. |
| 2011/0034209 | A1 | 2/2011 | Rubinsky et al. |
| 2011/0060704 | A1 | 3/2011 | Rubin et al. |
| 2011/0066949 | A1 | 3/2011 | DeLuca et al. |
| 2011/0090351 | A1 | 4/2011 | Cote et al. |
| 2011/0093492 | A1 | 4/2011 | Sull et al. |
| 2011/0098056 | A1* | 4/2011 | Rhoads et al. ............ 455/456.1 |
| 2011/0103684 | A1 | 5/2011 | Bhatt et al. |
| 2011/0106589 | A1 | 5/2011 | Blomberg et al. |
| 2011/0119100 | A1 | 5/2011 | Ruhl et al. |
| 2011/0137774 | A1 | 6/2011 | Jakilinki et al. |
| 2011/0141136 | A1 | 6/2011 | Cardno et al. |
| 2011/0178967 | A1 | 7/2011 | Delp |
| 2011/0191277 | A1 | 8/2011 | Ag ndez et al. |
| 2011/0196839 | A1* | 8/2011 | Smith et al. ............ 707/638 |

FOREIGN PATENT DOCUMENTS

| | | |
|---|---|---|
| EP | 1895459 A1 | 3/2008 |
| EP | 1993044 A1 | 11/2008 |
| WO | 0073957 A2 | 12/2000 |
| WO | 2008092147 A2 | 7/2008 |
| WO | 2008092149 A2 | 7/2008 |
| WO | 2011014912 A1 | 2/2010 |
| WO | 2011008361 A1 | 1/2011 |
| WO | 2011008659 A2 | 1/2011 |
| WO | 2011024163 A1 | 3/2011 |

OTHER PUBLICATIONS

Virtual environments for geographic visualization: potential and challenges, Alan M. MacEachren, Robert Edsall, Daniel Haug, Ryan Baxter, George Otto, Raymon Masters, Sven Fuhrmann, Liujian Qian Nov. 1999.*

Applications of Computer Graphics to the Visualization of Meteorological Data T. V. Papathomas, J. A. Schiavone and B. Julesz, Computer Graphics, vol. 22, No. 4, Aug. 1988.*

* cited by examiner

ALERT PROFILE EDITOR

DASHBOARD | ADMIN | PREFERENCES | LOGOUT

PROFILE 1

OPEN OTHER ALERT PROFILE    ADD NEW ALERT PROFILE

☑ ENABLED – ALERT PROFILE IS ACTIVE.

▼ ALERT PROFILE DEFINITION                              ▶ REQUIRED

NAME*                                  (?) [ PROFILE 1 ]

INCLUDE STOPLIGHT ALERTS?              (?) ⦿ YES  ○ NO

STOPLIGHT IS RED FOR*                  (?) [ 2 ] VALUE(S) IN A ROW

STOPLIGHT WAS NOT RED FOR*             (?) [ 1 ] OR MORE PRIOR VALUE(S)

ALERT ON NEW "BEST EVER"
MEASUREMENT?                           (?) ⦿ YES  ○ NO

ALERT ON NEW "WORST EVER"
MEASUREMENT?                           (?) ⦿ YES  ○ NO

ALERT ON UNUSUAL VALUE?                (?) ⦿ YES  ○ NO

FIGURE 11

SOCIAL ANNOTATION OF A SINGLE EVOLVING VISUAL REPRESENTATION OF A CHANGING DATASET

FIELD OF TECHNOLOGY

This disclosure relates to social annotation of a single evolving visual representation of a changing dataset.

BACKGROUND

A user (e.g. a merchant, a vendor, a customer) may be interested in analyzing a set of data associated with a business. For example, the set of data associated with the business may be sales figures, a number of customers and/or a number of visitors to a website among other numerical data. The user may want to analyze and visualize the set of data to improve a set of business practices or enhance services offered to clients. The user may use a program to create graphs and other visualizations of the data. However, the user may also want to mark and create reminders related to the graphs and other visualizations. For example, the user may print out graphs and copies and may make notes on the sheet of paper. In another example, the user may store a set of notes related to the data and/or visualization in a separate document. Further the user may want to send the data and/or visualizations and the notes associated with the data and/or visualizations to a group of colleagues. The user may need to print out multiple copies of the data and/or visualizations or may have to send additional documents along with the data. This may prove inefficient and time consuming, and valuable communication between colleagues may therefore be compromised. The user may not be able to easily track the set of data and may consequently lose valuable analytics associated with the set of data. As a result the user may be at a significant business disadvantage and may incur huge financial losses.

SUMMARY

This disclosure relates to social annotation of a single evolving visual representation of a changing dataset.

In one aspect, the method includes generating a visual representation of a dataset at an initial time. The method also includes placing a first marker on the visual representation associated with a first user having access privileges to the visual representation. Further, the method includes determining that the dataset at the initial time has changed. The method further includes automatically updating the visual representation of the dataset to reflect the dataset at a changed time through an algorithm that applies changed values between the dataset at the initial time and the dataset at the changed time while maintaining a previous calculation of an unchanged portion of the dataset previously calculated when generating the visual representation of the dataset at the initial time. The method may also include minimizing a refresh time of the visual representation at the changed time when the algorithm is applied because the unchanged portion of the dataset previously calculated when generating the visual representation of the dataset at the initial time is maintained. The method also includes determining that the first marker placed on the visual representation of the dataset at the initial time is still relevant to the visual representation at the changed time. The method further includes maintaining the first marker on the visual representation of the dataset at the changed time when the first marker is determined to be still relevant to the visual representation of the dataset at the changed time. The method also includes removing the first marker on the visual representation of the dataset at the changed time when the first marker is determined to not be relevant to the visual representation of the dataset at the changed time.

The method also includes determining a change status of the underlying data associated with a visual location of the first marker placed on the visual representation at the initial time. The method may also include when the change status indicates that the underlying data has changed beyond a threshold tolerance range, then removing the marker on the visual representation associated with the changed time. The method may further include when the change status indicates the underlying data has not changed beyond a threshold range, then maintaining the marker on the visual representation associated with the changed time. The method also includes generating an alert when the change status indicates that the underlying data has changed beyond the threshold tolerance range.

The method may further include placing a first note associated with the first user on the first marker. The method may also include placing a second marker associated with a second user on the visual representation of the data set. The method may further include associating a comment placed by the second user with the first note.

The method may further include associating the comment placed by the second user on the first marker associated with the first user. The method also includes publishing the visual representation on a social graph associated with the first user when the first user has access privileges to publicly publish the visual representation to an external party.

The threshold tolerance range may be at least one of a customized range, a system-defined range and a user adjustable range.

BRIEF DESCRIPTION OF THE DRAWINGS

Example embodiments are illustrated by way of example and not limitation in the figures of the accompanying drawings, in which like references indicate similar elements and in which:

FIG. 11 is a sample alert profile editor.

DETAILED DESCRIPTION

Figure 1:
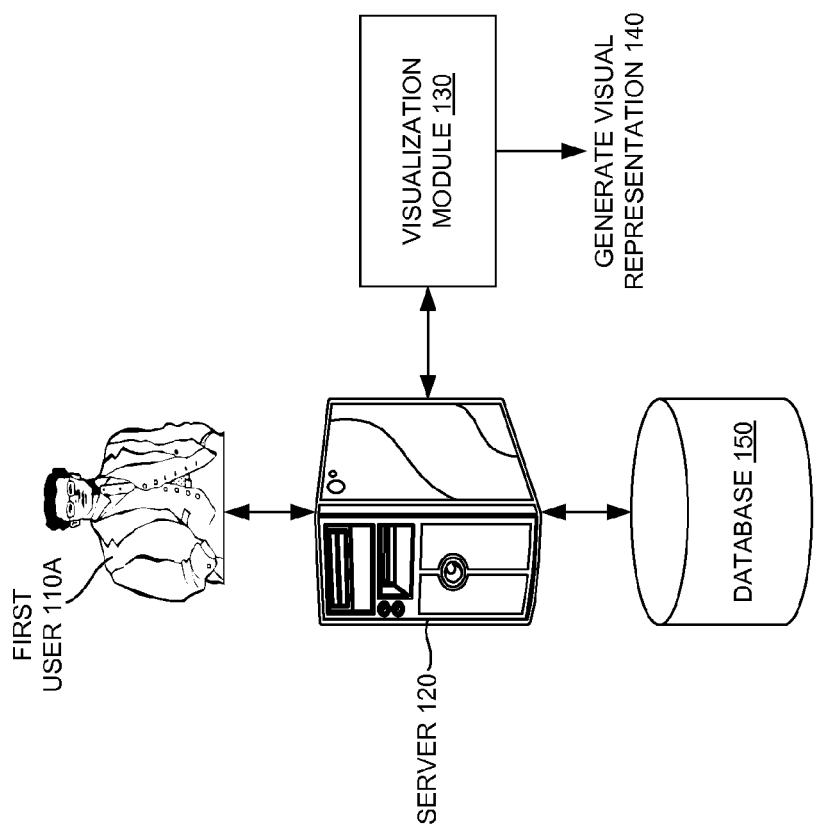
FIG. 1 illustrates an interaction flow overview of the server with the visualization module and the database to the various users of the system.

This disclosure relates to social annotation of a single evolving visual representation of a changing dataset. In the following description, for the purposes of explanation, numerous specific details are set forth in order to provide a thorough understanding of the various embodiments. It will be evident, however, to one skilled in the art that the various embodiments may be practiced without these specific details.

System Overview

The application discloses methods related to social annotation of a single evolving visual representation of a changing dataset and a method of visual annotation on the visual representation of the changing data set. A set of users in a company of a large organization may want to store, organize and visualize a set of data stored in a database. A first user may create a dataset and may want to visualize that particular dataset. The first user may have access privileges to the server and may have access privileges to the database. The first user may automatically have access privileges to the data set that he creates. The server may also be connected to a visualization module that may create a visual representation of the data set associated with the first user. The visualization module may create a marker for every value in the data set and may mark the value on the visual representation. For example, the data set may contain a set of sales figures for every month of the year 2000. The visualization module may create a marker on the visual representation for every value on the data set. For example, if the sales figure for January was 8.5 million, the visualization module may, after generating a bar graph, place a marker at 8.5 million at the y coordinate and at January 2000 on the x coordinate. Similarly, the visualization module may place markers on the visual representation for all the values of the data set. The visual representation may be a graph, a pie graph, a bar graph and any other visual representation of data using a mathematical model. In one or more embodiments, the data set may also be linked to an analysis module and a tracking module. In one or more embodiments, the data set may also be linked to a mathematical modeling module that may use a set of algorithms to create the visual representation of the data set. The visualization module may be automatically updated even when the underlying data set changes in one or more embodiments. In one or more embodiments, the first user may receive an alert when the data set reaches a value greater than the minimum threshold value set by the first user. In one or more embodiments, the first user may also annotate a particular marker in the visual representation with a note. The note placed on the marker in the visual representation may be directly placed on the visual representation in one or more embodiments. In one or more embodiments, the first user may place the note in any area of the visual representation. In one or more embodiments, a second user may place a comment on the note placed by the first user. The comment may be in response to the note placed by the first user, or may be part of a larger dialogue between the first user and the second user. In one or more embodiments, when the data set underlying the visual representation changes, the note may automatically remain with the marker at its mathematically accurate position. When the marker is no longer relevant, the note may not appear on the visual representation, according to one or more embodiments.

FIG. 1 describes the interaction between the first user 110A, a server 120, a visualization module 130 and a database 150.

In one embodiment the server may be a combination of a set of computers. In another embodiment, the server 120 may be a single computer. In yet another embodiment, a workstation may be configured to function as a server 120. The server 120 may further include a processor, a memory, an analysis module, a tracking module, a mathematical module and other modules. In one or more embodiments, the server may be in a cloud. In another embodiment, the database 150 may be in the server 120. The database 150 may also be in a data processing unit associated with the user. The data processing unit associated with the user may include a user interface that may enable the user to access the server 120 and may display the visual representations generated by the visualization module. In one or more embodiments, the database 150 may be connected to the data processing unit associated with the user. In one or more embodiments, the database 150 may be a storage system and may include a collection of data sets. In one or more embodiments, the visualization module may use the data stored in data sets in the data base 150 to generate a visual representation 140.

Figure 2:
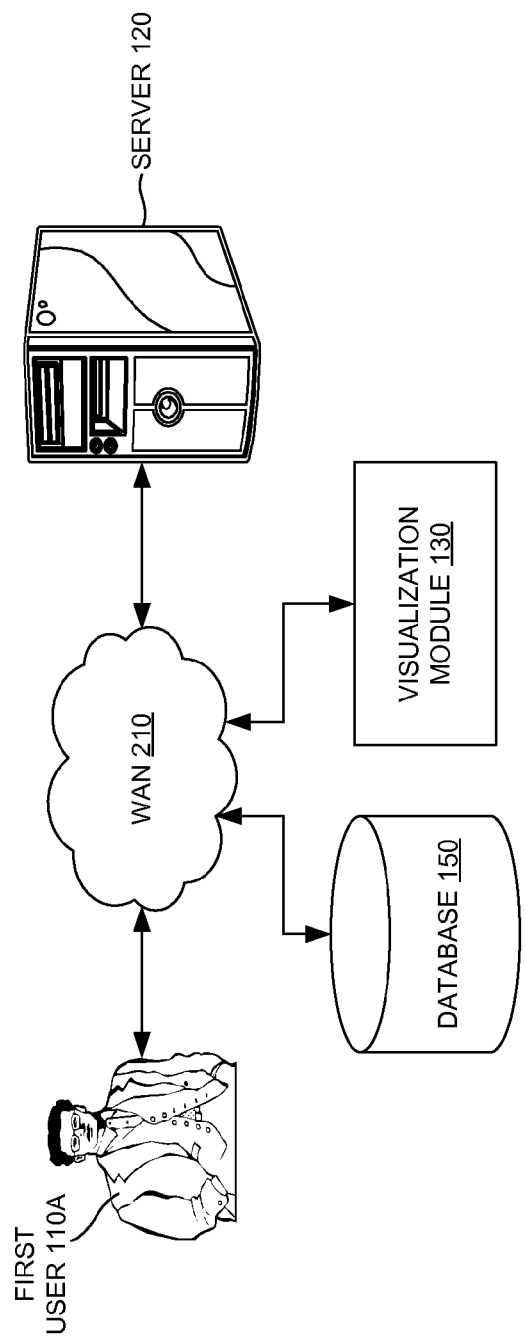
FIG. 2 is another interaction flow diagram showing an interaction between the first user, the server, database and the visualization module through a wide area network.

FIG. 2 describes the relationship between the first user 110 A, the server 120, the visualization module 1300 and the database 150 and a Wide Area Network (WAN) 210.

In one or more embodiments, the first user 110 A may access the server 120 through a wide area network. In one or more embodiments, the WAN 210 may also be a local area network and may be any network that may connect the user to the server 120. In one or more embodiments, the database 150 may be connected to the server 120 through the WAN 210. In one or more embodiments, the database 150 may be included in the data processing unit that the first user 110 may use to access the WAN 210. In another embodiment, the database 150 may be at the server end of the system. In one or more embodiments, the server 120 may include a visualization module 130. In one or more embodiments, the visualization module 130 may be connected to the server 120 through a WAN 210.

Figure 3:
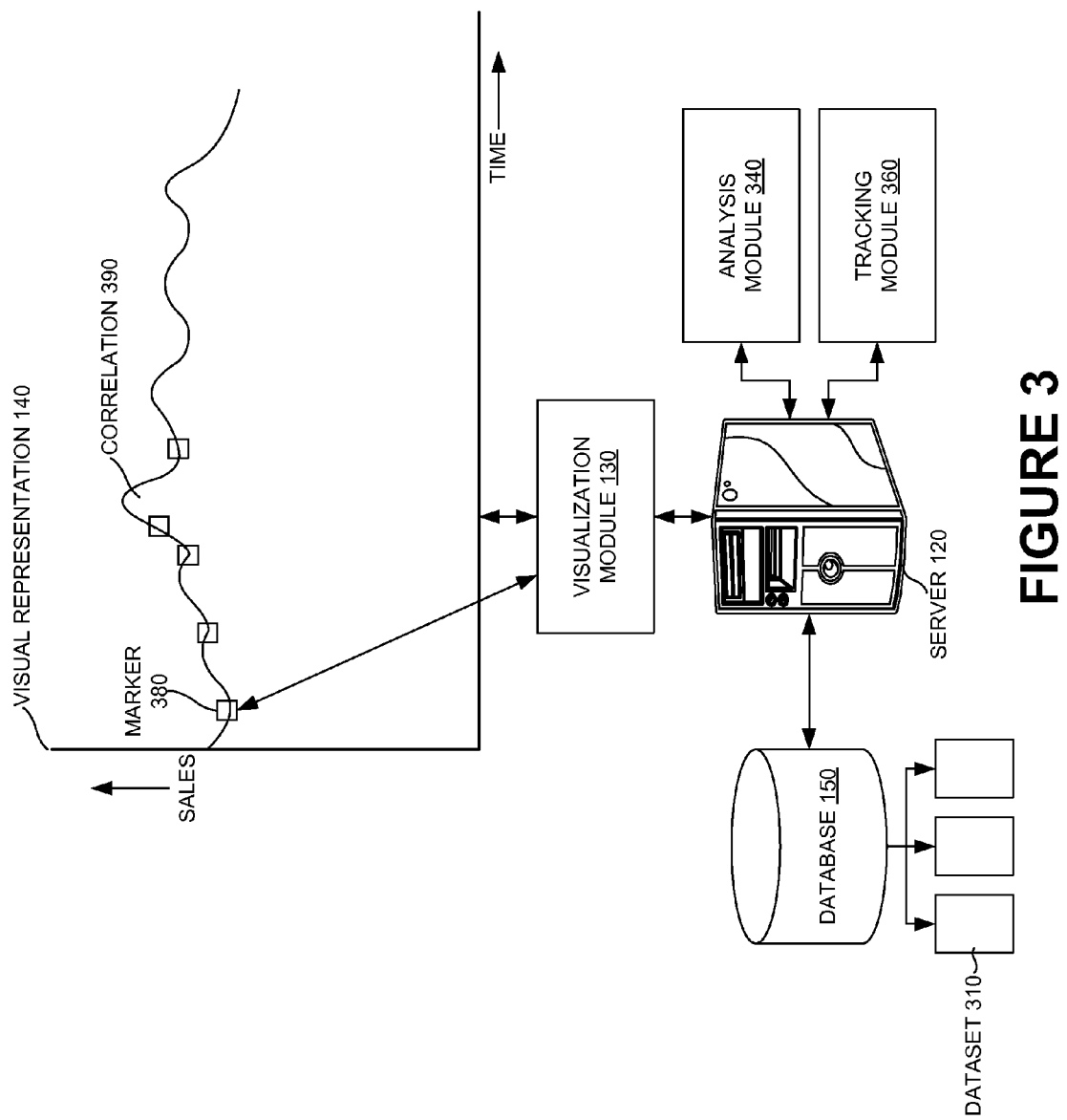
FIG. 3 illustrates a visual representation of a dataset and its relation to the server, the first user, the visualization module, the analysis module and the tracking module.

FIG. 3 illustrates the database 150, a marker 380, the visual representation 140, the server 120, an analysis module 340, a tracking module 360 and the visualization module 130.

In one or more embodiments, the visualization module 130 may generate the visual representation 140 at an initial time. In one or more embodiments, the initial time may be the instant at which the data set is completely inputted in the system. The initial time may be set by an administrator of the system, or may also be set by a set of users in the system, in one or more embodiments. In one or more embodiments, the server 120 may further include the analysis module 340 and the tracking module 360. In one or more embodiments, the visualization module may receive inputs from the analysis module 340 and the tracking module 360. In one or more embodiments, the database 150 may store a set of datasets. In one or more embodiments, the first user may create a dataset, and/or input a dataset into the system. For example, the first user may be an analyst working at a company and the analyst may want to examine a growth of the company in terms of sales figures over a period of time. The first user, in this case may input the dataset into the system after receiving a user access privilege from the system. In one or more embodiments, the server 120 may create an account for the user and store a set of information and/or a set of data sets created and/or inputted by the user in the account. In the present case, the user, who may be the analyst of the company, may input the data set into the database after accessing the server 120. The analyst may want to visualize the data set in one or more embodiments. In one or more embodiments, the visualization module 130 may apply an algorithm to convert the data set into the visual representation 130. The visual representation may create a marker 380 associated with a single data point in the data set and may place the marker 380 on the visual representation 140 in one or more embodiments.

In one or more embodiments, the tracking module 360 may determine that the dataset at the initial time has changed. For example, the dataset may include more data points. In one or more embodiments, the analysis module 340 may analyze a set of new data and/or new data points, and through the visualization module 130 may automatically update the visual representation 140 to reflect the dataset at the changed time. The changed time may be the time when the new data and/or new data points are inputted into the system. In one or more embodiments, the analysis module 340 may employ various algorithms and mathematical modeling to analyze the data. In one or more embodiments, the analysis module 340 may use an algorithm that may apply a set of new data or a changed value in the dataset at the initial time and the dataset at the changed time while maintaining a previous calculation of an unchanged portion of the dataset that was previously calculated when the visual representation 140 was first generated at the initial time. For example, if a dataset representing set of sales figures of a company in the year 2010 was inputted in the system at an initial time in December 2010, and a new data point was inputted into the system for January and February 2011 in March 2011(changed time), the algorithm may maintain a previous calculation for the unchanged portion of the dataset (January 2010 to December 2010) while applying the algorithm on the changed values and or the new data points (January 2011 and February 2011).

In one or more embodiments, the analysis module 340 may minimize a refresh time of the visual representation at the changed time. Since the visual representation of the dataset at the initial time was already graphed in the visual representation 140 through the visualization module 130 the refresh time may be very low such that only changed values and/or new data points may need to be analyzed and graphed and/or visualized in the visual representation 140.

In one or more embodiments, the analysis module 340 may further be connected to a graphing program like Excel® and/or other analytic tool to analyze and graph the data through the visualization module 130.

In one or more embodiments, the analysis module 340 may analyze the data set. In one or more embodiments, the visualization module 130 may then generate the visual representation 140 and may place the markers 380 on the visual representation based on the analysis module. In one or more embodiments, the tracking module may track the data set and update the visualization module 130 when a new data point is updated into the data set. For example, in the above example, when the first user created the data set, he may have inputted a set of annual sales figures for the company between the years 2000 to 2010. At the end of the year in 2011, the data set may be automatically updated for a data point for the annual sales figure for 2011. The tracking module 360 may track this value and update the visualization module that a new value has been inputted into the data set. The visualization module 130 may then create a new marker 380 for the new data point for the annual sales figure in 2011 and place the marker on the visual representation 140 in one or more embodiments. In one or more embodiments, the markers 380 may be automatically rearranged, through the visualization module 130, when the visual representation takes a different shape or when the visual representation takes a bigger or smaller shape. For example, the first user, who may be the analyst in the company, may input 10 more data points into the data set. As a result the visual representation may take a larger shape. The markers 380 may be automatically rearranged and repositioned based on an updated analysis performed through the analysis module 340. In another embodiment, the first user may want to create a different type of visual representation of the same data set. For example, the first user may want to see the sales figures over the years but may want it to be represented through a pie chart. In such a case, the visualization module 130 may consult with the analysis module 340 and generate a pie chart visualization of the data set. In one or more embodiments, the markers 380 may also take a different form in the different visualization but may be accurately represented in the different visual representation. The visualization module 130, in conjunction with the analysis module 340, may also analyze the data and generate an analysis of the data set and the visual representation in one or more embodiments. In one or more embodiments, the visualization module 130 may generate a correlation 390 based on the data set and the markers 380. The analysis module 340 may also generate a mean, a median, a standard deviation and a variance based on the data set, in one or more embodiments. In one or more embodiments, the analysis module 340 may communicate this information to the visualization module 130 and the visualization module 130 may represent the mean, the media, the standard deviation and the variance on the visual representation 140 (FIG. 11).

In one or more embodiments, the visualization module 130 may determine that the marker 380 placed on the visual representation is still relevant to the visual representation at the changed time. For example, the visualization module 130 may determine the sales figures in future years are independent of sales figures in previous years, and may determine the marker 380 placed for sales figures in 2010 is still relevant if new data and/or changed values for sales figures in 2011 are inputted at the changed time. In such a case, the visualization module may maintain the mark when it determines the marker 380 is still relevant. If the visualization module 130 determines that the marker is no longer relevant, the marker may be removed and/or repositioned at a different area of the visual representation 140. For example, if the new data inputted indicates a change in the value for sales figure in December 2010, the first marker may not be relevant anymore. In such a case, the visualization module may remove the first marker and may reposition it at a correct location in the visual representation 140.

Figure 5:
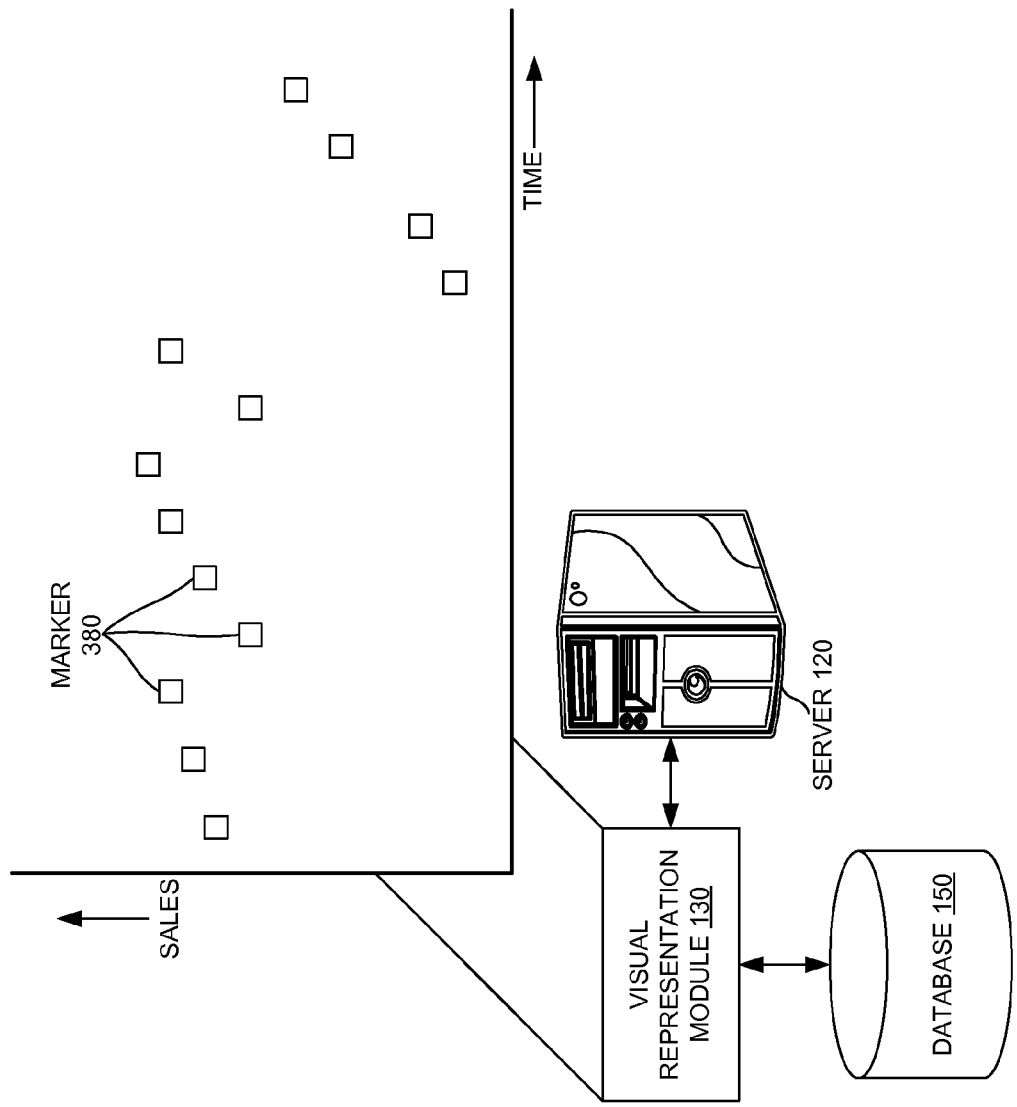
FIG. 5 illustrates a series of markers on a visual representation.
Figure 9:
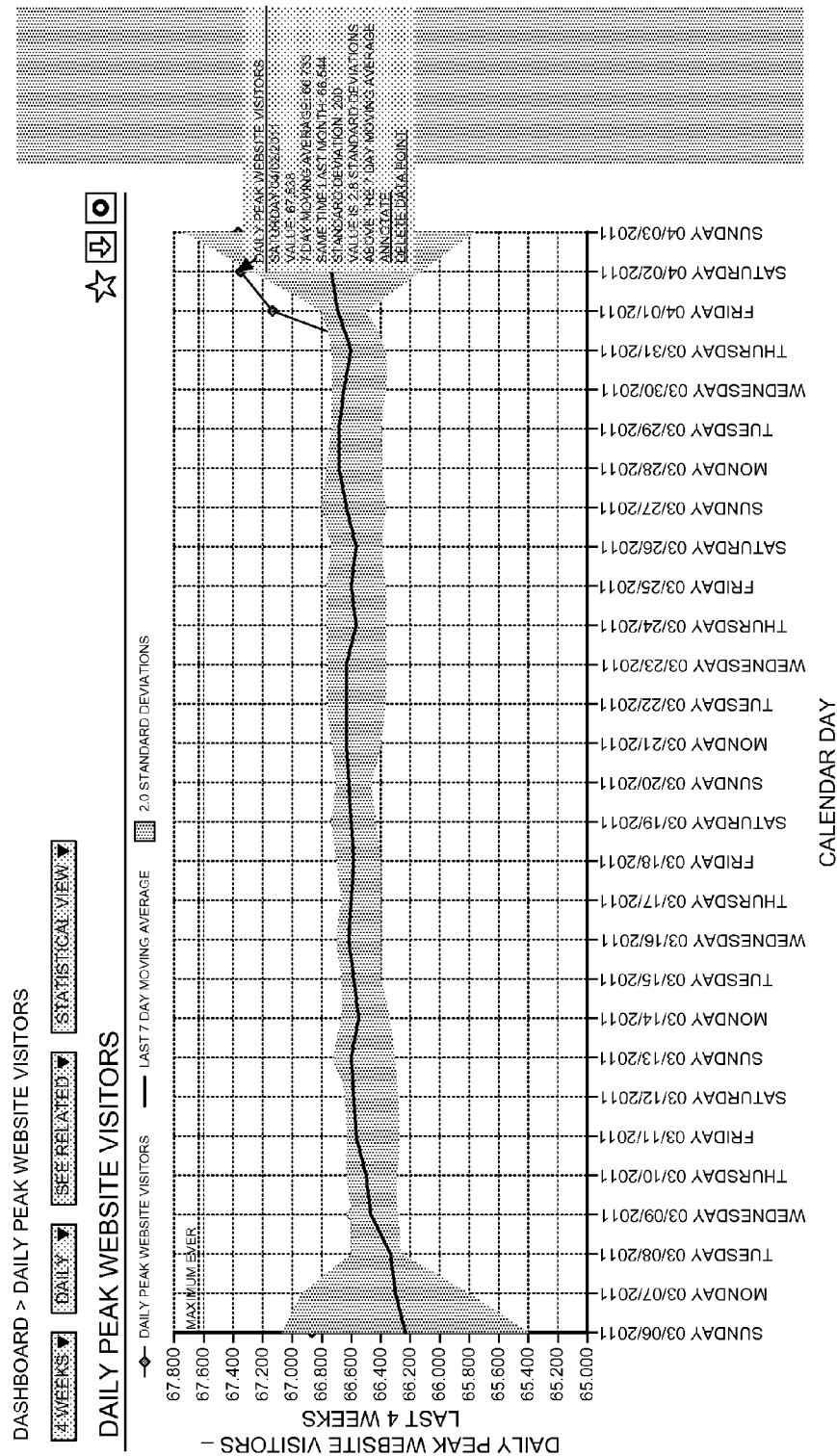
FIG. 9 is a sample of a visual representation also depicting a changing value for the standard deviation.

In one or more embodiments, the user 110 may create a set of user preferences such that the user 110 may receive an alert when certain conditions are fulfilled in the data (FIG. 13). In one or more embodiments, the visualization module 130 may also visually represent the set of user preferences on the visual representation 130. For example, the user 110 may request that an alert be generated when the value in the dataset for the annual sales figure surpasses $10 million. In one or more embodiments, when a new data point and/or changed value for the annual sales figures is inputted at the changed time such that the annual sales figure in 2011 is $11 million, the analysis module 340 may immediately generate an alert to the user. In another example, the user may want to be alerted if the sales figure for a particular year is too low. The user may then be able to take remedial actions after being alerted by the system. In one or more embodiments, the visualization module 130 may also create a visual representation of a target or an alert in the visual representation of the dataset. For example, if a target sales figure for the company is $15 million, the user may be able to create a set of user preferences such that the user 110 may be able to visualize if and when the actual sales figures are close to the target sales figure of $15 million (FIG. 5). In another embodiment, the user 110 may request an alert to be generated when the annual sales figure drops to less than 2 standard deviations of the mean sales figures (FIG. 9). In one or more embodiments, the visualization module may visualize two standard deviations below and above the mean in the visual representation 140 as well.

Figure 4:
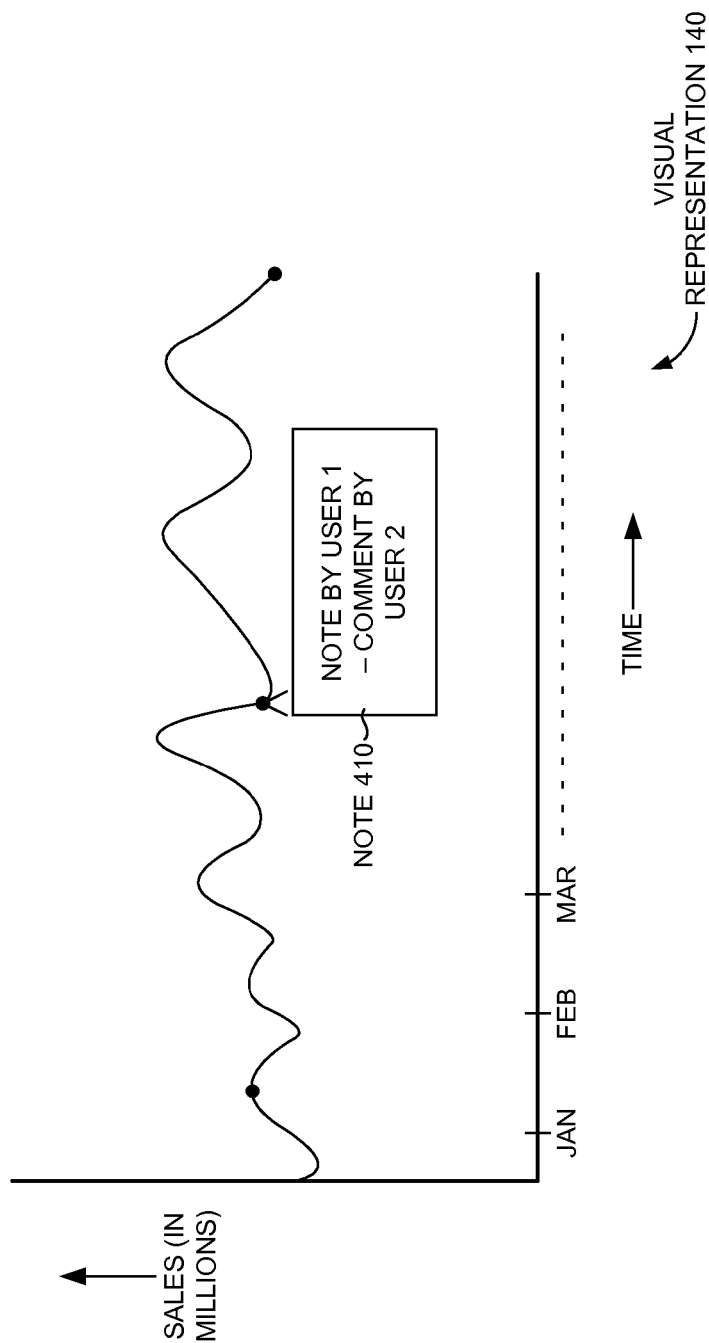
FIG. 4 a sample visual representation with annotated notes by a set of users.

FIG. 4 provides a detailed view of the visual representation 140.

In one or more embodiments, the first user 110 A may annotate the visual representation 130 to place a note on a particular part of the visual representation. For example, the analyst of the company in the above example may want to consult with other users of the company and may want to point out areas of interest within the visual representation. For example, in the year 2005, sales figures may have been uncharacteristically low, and the analyst may want to place a note at the marker for 2005 indicating a reason as to why sales figures may have been uncharacteristically low. In one or more embodiments, the visualization module may place the note 410 in the area selected by the first user 110 A. In another embodiment, the visualization module may place a note on multiple markers. In yet another embodiment, the first user 110 A may be able to click any point on the visual representation and annotate the visual representation 140. In another embodiment, the first user 110 A may be able to drag and select multiple markers and place a single note concerned multiple markers. For example, the sales figures for the years 2003-2005 may have been uncharacteristically low and the first user may drag a mouse over the entire area spanning the three markers and create a single note. In one or more embodiments, a second user 110 B may be able to place a comment on the note. In one or more embodiments, the visualization module 130 may color code the notes and comments such that the note and/or comment created by the first user 110 A may be of a different color and/or shape when compared to a different note and/or comment created by the second user 110 B. In one or more embodiments, the first user 110 A may be alerted when the note is commented on by the second user 110 B. In one or more embodiments, a location and/or placement of the note and the comment may change depending on the location and/or physical placement of the marker. In one or more embodiments, the visualization module 130 may link the note to the particular marker to which the note is affixed such that the note may move with the marker. In one or more embodiments, if the marker is no longer relevant to the visual representation, the note may also disappear. In another embodiment, the system may alert a set of users of the system a note has been placed on a particular marker but when the particular marker is no longer relevant to the visual representation.

Figure 6:
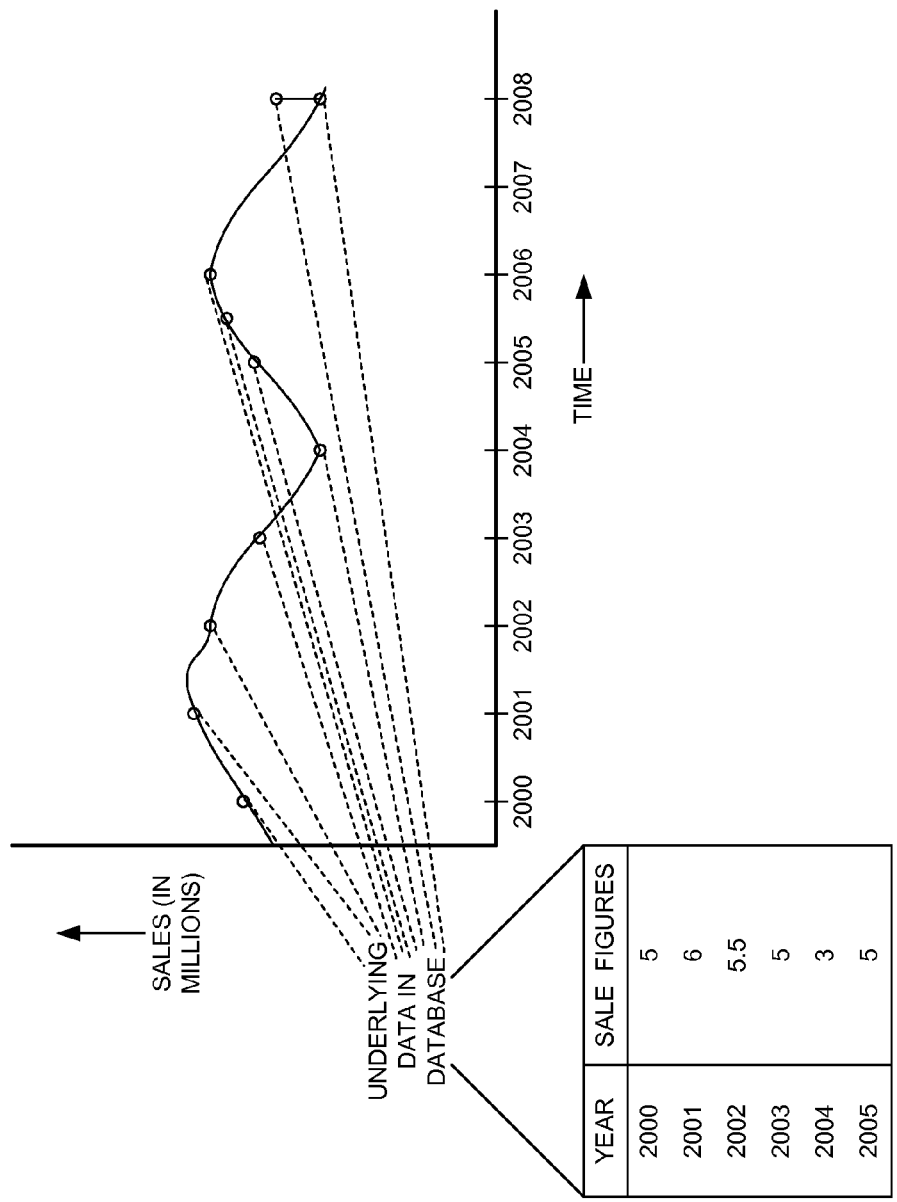
FIG. 6 illustrates an underlying data set and a set of markers on the visual representation.

FIG. 6 illustrates the underlying dataset and the visual representation 140.

Based on the data set, in this case sales figures for the company from the years 2000-2001, the visualization module 130 may generate a set of markers for every data point in the data set. In this case, for example, the data point for the year 2000 is 5; the data point for the year 2001 is 6 and so on. When the underlying data of the dataset changes, the markers also change accordingly, in one or more embodiments.

Figure 7:
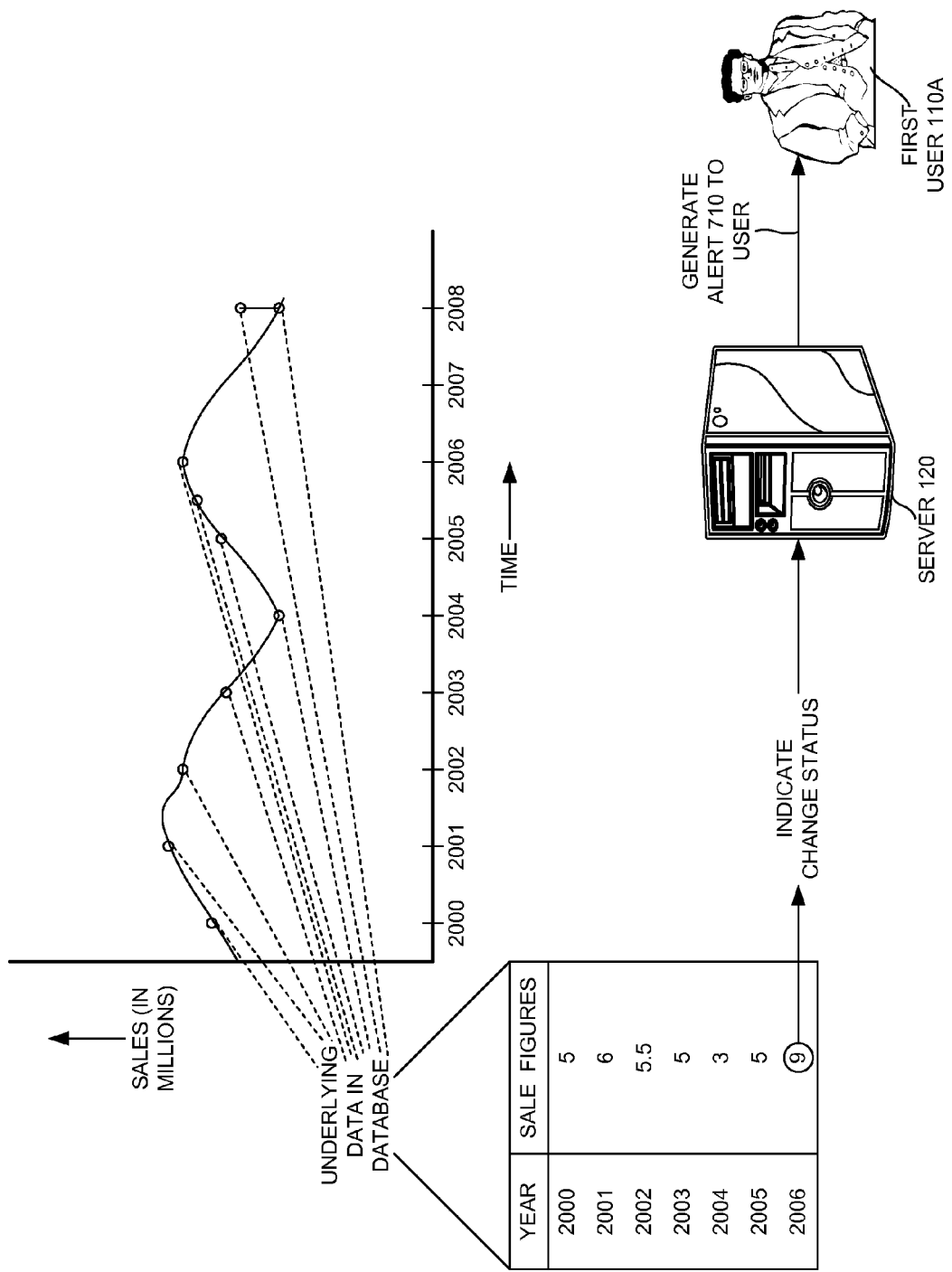
FIG. 7 illustrates a change status in the underlying dataset and a method of generating an alert to the first user.

FIG. 7 illustrates the underlying data set and a change status of the data in the visual representation 140.

In one or more embodiments, the visualization module 130 may determine a change status of the underlying data associated with a visual location of the marker placed on the visual representation at the initial time. In one or more embodiments, when the change status indicates that the underlying data has changed beyond a threshold tolerance range, the visualization module 130 may remove the marker 380 from the visual representation 140. The threshold tolerance range may be a minimum change status set by the user and/or system administrator. In one or more embodiments, the threshold tolerance range may be a customized range, a system-defined range and/or a user adjustable range. For example, the user may have set the threshold tolerance range to be $500 in the above example. In this case, if the change status of the underlying data does not move more than $500, the visualization module 140 may maintain the marker 380 at its current location on the visual representation. If the change status is more than $500, the visualization module may remove the marker and/or reposition the marker 380 at a different location of the visual representation 140. In one or more embodiments, when the underlying data has changed beyond the threshold tolerance range, an alert may be generated to the user 110.

Figure 8:
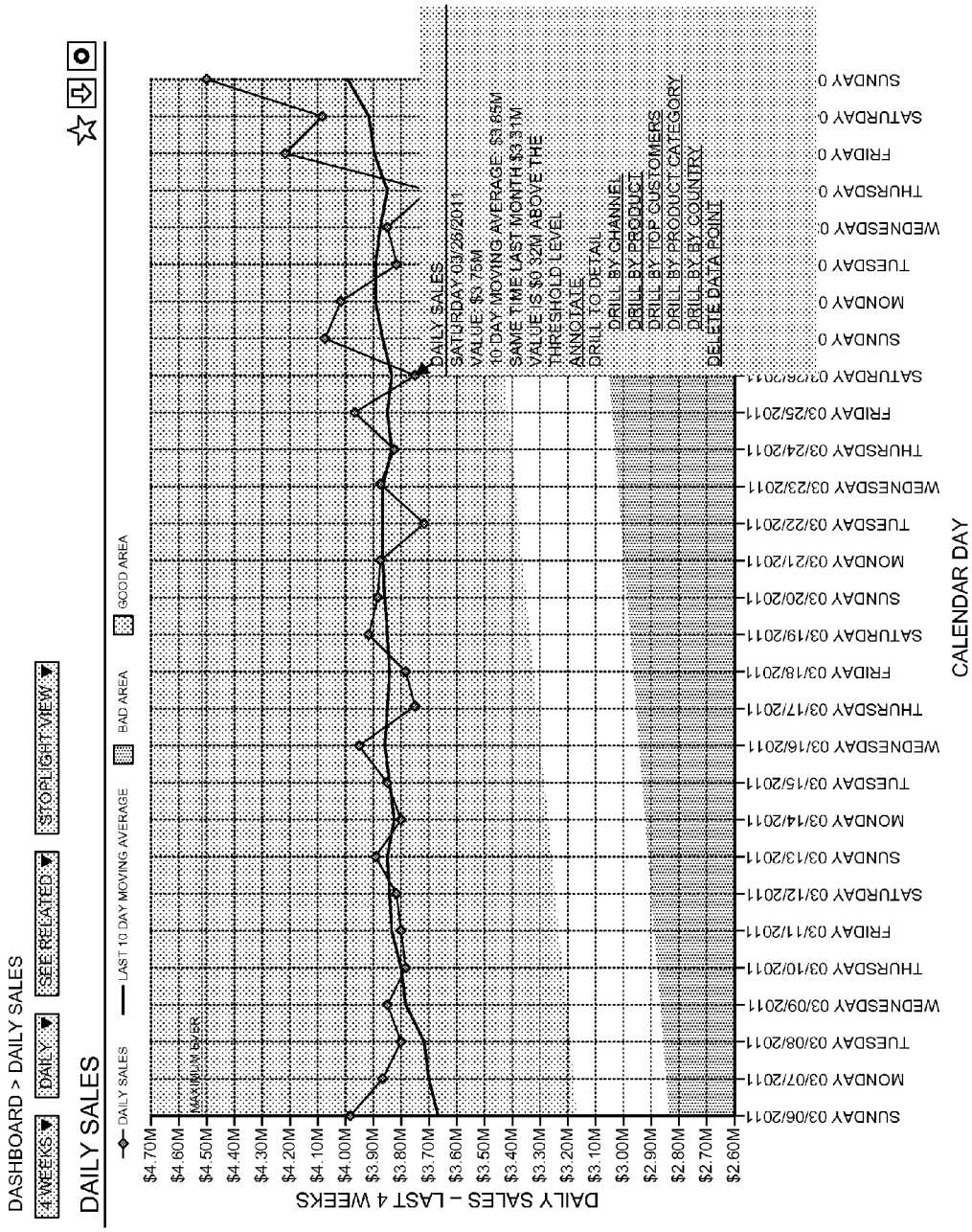
FIG. 8 further illustrates notes and comments on the visual representation.

FIG. 8 illustrates a sample graph of daily sales at a company. The marker 380 may also show a set of underlying data of the data point in one or more embodiments. In one or more embodiments, the marker 380 may show a set of details related to the marker. The note may appear in front of the marker 380 in one or more embodiments. In one or more embodiments, the note may appear close to the marker 380. In one or more embodiments, the note may show a date, time, and a set of details related to the marker. In one or more embodiments, the user may add a comment on the note as well such that when a user runs his mouse or tracker over the marker, the note shows a set of relevant details as well as a comment and a set of notes related to the marker 380. In one or more embodiments, the graph may be color coded to show more analytics and visual data to the user.

FIG. 9 illustrates a sample visual representation also depicting a standard deviation range showing daily peak website visitors for a user's website. In one or more embodiments, the graph may depict a range showing a standard deviation for the graph as shown in FIG. 9. In one or more embodiments, the range may be shaded or darkened as it has been in FIG. 9. In one or more embodiments, the system may automatically generate an alert when a value is outside the range of the standard deviation. For example, when a marker 380 falls outside the range, the user may automatically receive an alert showing that the value has crossed the expected standard deviation for that particular data set.

Figure 10:
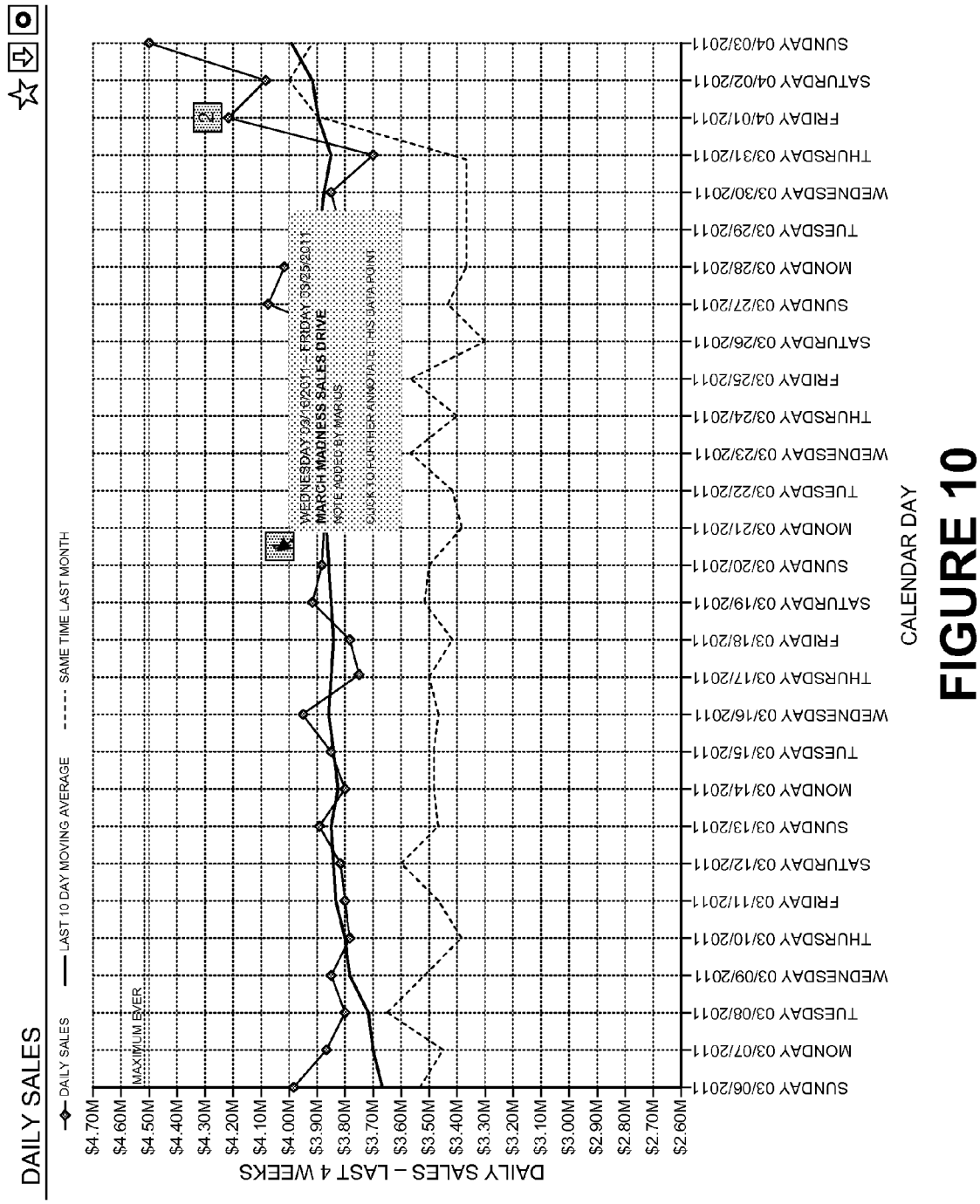
FIG. 10 is a sample of a visual representation.

FIG. 10 illustrates a sample annotation and creation of a note at a particular location of the visual representation 140. In one or more embodiments, the user may annotate the graph as described in detail previously. For example, the user may want to annotate two particular points on the graph as shown in FIG. 10. In one or more embodiments, the annotated points and/or markers may be displayed with a number, a letter, or any other sign. In this case, the annotated points are "1" and "2" as they appear in FIG. 10. In one or more embodiments, the user may click on "1" to further annotate the note on the marker. In one or more embodiments, the user may be able to place a note, or be able to annotate a part of the graph that may not be covered by a marker 380. For example, "1" may appear on top of the entire graph, and the user may still be able to write a comment on the note.

FIG. 11 illustrates a sample of a set of user preferences that may generate alerts to the user 110. In one or more embodiments, the user may be able to select a set of preferences to the system. In one or more embodiments, the user may be able to customize what kinds of alerts he may receive. In one or more embodiments, the user may be able to receive an alert based on "stoplights". A Stoplight may show values that are red, green and yellow, in one or more embodiments. In one or more embodiments, red values may be values that may need attention from the user. For example, the user may want to monitor a set of monthly sales figures. The user may stipulate that if sales values are greater than a particular value, then the value may be green. If the value is a moderate value, the value may be shaded yellow. If the value is below a minimum threshold value stipulated by the user, the value may be shaded red, and may be cause for concern for the user. For example, the user may stipulate that if the monthly sales figures are less than $10,000, that the user be immediately notified. In one or more embodiments, the stoplight feature may also be displayed on the graph such that graph is color coded based on the values of the graph.

In one or more embodiments, the user may also stipulate that he receive an alert for an unusual value, or for a worst value, or a best value. The user may receive automatic alerts when such values are detected by the system, in one or more embodiments.

Figure 12:
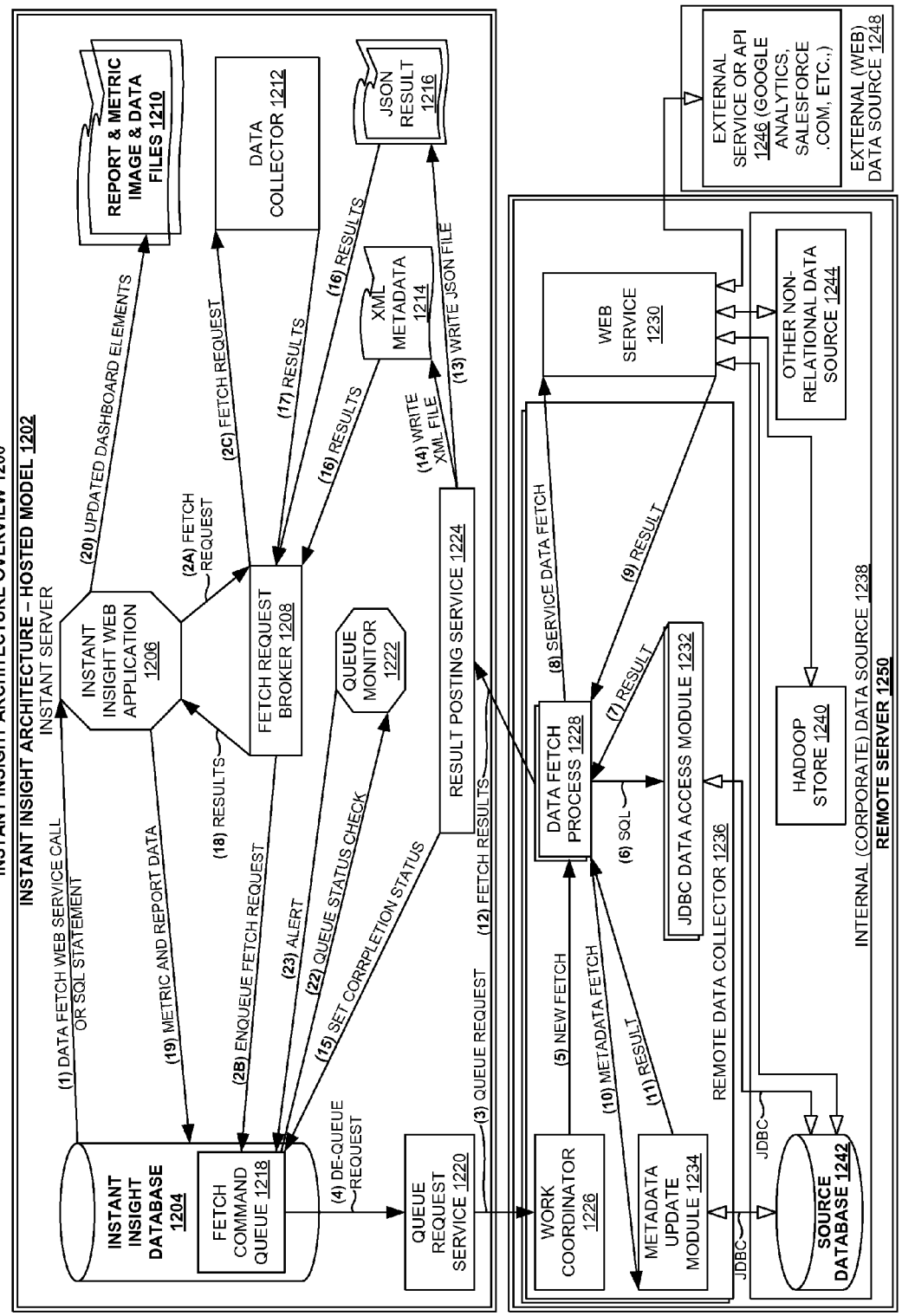
FIG. 12 is an overview diagram illustrating the architecture of the system.

FIG. 12 illustrates an architecture overview of the system. In one or more embodiments, FIG. 12 illustrates the backend architecture of the system enabling annotation of the graph and placing markers on the graph.

In one or more embodiments, FIG. 12 illustrates a data collection process for an application. In one or more embodiments, a data fetch may be initiated by a core application. In one or more embodiments, the core application may have both PHP and Python components. In one or more embodiments, the core application may fetch the database or web service credential from an application database. In most cases, such as when a pre-defined metric or report is executed, the data fetch command may be collected from the database. In one more embodiments, in other cases, such as when the user validates a statement, the data fetch command may be collected directly from a PHP user interface.

In one or more embodiments, if the data is to be collected from a database, the application may pass the database connection information to A JDBC data access module. If the data collection is to be performed using a web service, the web service call may be made by passing in authenticated information as well as metric and report run-time parameters that may be passed as POST variables.

In one or more embodiments, the JDBC access module or web service may execute the data fetch command and may receive the result and package it into a JSON. In one or more embodiments, the results may be returned to the application. If any errors are encountered, the errors m may be able wrapped in JSON and returned, in one or more embodiments.

In one or more embodiments, a set of metrics values as well as report and metrics metadata may be stored in the application database for all data collection events. In one or more embodiments, the validating events may not include this step, and the results may only be shown in the UI.

In one or more embodiments, the JSON data files as well as image files for charts may be created by the application engine based on the returned data and may be stored in the file system with associated linking records created in the database metadata.

In one or more embodiments, in a hosted model, the core application may run on a server either in the customer's location or in the cloud. In this configuration, the system may support both locally-initiated and remotely-initiated data fetch requests. Each metric report may be configured to collect data based on either a fetch command run from the server or through a command run or another server behind a customer's firewall. This may allow the ability to run certain types of fetch commands locally when the executable that is required to run the fetch-command cannot be invoked directly from the server.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software. For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    generating, through a server, a visual representation of a data set at an initial time;
    placing a first marker on the visual representation corresponding to a first user having access privileges to the visual representation through the server based on the data set at the initial time;
    tracking a change to the data set at a subsequent time through the server;
    automatically performing, without a requirement of intervention on part of the user, a process comprising:
        updating the visual representation of the data set to reflect the change thereto at the subsequent time through the server based on an algorithm that applies changed values between the dataset at the initial time and the dataset at the changed time while maintaining a previous calculation of an unchanged portion of the dataset previously calculated when generating the visual representation of the dataset at the initial time;
        minimizing, through the server, a refresh time of the visual representation relating to the automatic update thereof to reflect the change to the data set based on retaining the relevant data set at the initial time;
        determining, through the server, that the first marker placed on the visual representation of the data set at the initial time is still relevant to the visual representation at the subsequent time;
        maintaining the first marker on the visual representation of the data set at the subsequent time when the first marker is determined to be still relevant to the visual representation of the data set at the subsequent time; and
        repositioning the first marker on the visual representation of the data set at the subsequent time when the first marker at the initial time is determined to not be relevant to the visual representation of the data set at the subsequent time; and
    enabling, through the server, a social evolution of the visual representation of the data set through providing a capability to the user and another user also having access to the server to annotate the visual representation of the data set.

2. The method of claim 1, wherein determining a relevance of the first marker at the initial time to the visual representation of the data set at the changed time comprises at least one of:
    determining a change status of an underlying data associated with a visual location of the marker placed on the visual representation at the initial time,
        wherein when the change status indicates that the underlying data has changed beyond a threshold tolerance range, the marker is updated on the visual representation associated with the subsequent time, and wherein when the change status indicates that the underlying data has not changed beyond the threshold tolerance range, the marker is maintained on the visual representation associated with the subsequent time; and automatically generating an alert when the change status indicates that the underlying data has changed beyond the threshold tolerance range.

3. The method of claim 1, wherein enabling social evolution of the visual representation includes at least one of:

providing, through the server, a capability to the first user to place a note on the first marker;

providing, through the server, a capability to the another user to place a comment on the note of the first user on the first marker on the visual representation;

associating, through the server, a comment placed by the another user with the note placed by the user; and associating, through the server, the note and a set of comments to the note with the first marker such that a position of the note is undated when a position of the marker is updated.

4. The method of claim 3, further comprising at least one of:

associating, through the server, the comment placed by the another user on the marker associated with the user; and enabling, through the server, publishing of the visual representation on a social graph associated with the user when the user has access privileges to publicly publish the visual representation to an external party.

5. The method of claim 2, wherein the threshold tolerance range is at least one of a customized range, a system-defined range and a user-adjustable range.

* * * * *